(No Model.)

J. H. WHALING.
MODE OF SECURING THE FASTENINGS OF DRILLING TOOLS.

No. 387,475. Patented Aug. 7, 1888.

Attest:
N. W. Perkins Jr.
Omar Gillett

Inventor:
John H. Whaling.

UNITED STATES PATENT OFFICE.

JOHN H. WHALING, OF KINGMAN, KANSAS.

MODE OF SECURING THE FASTENINGS OF DRILLING-TOOLS.

SPECIFICATION forming part of Letters Patent No. 387,475, dated August 7, 1888.

Application filed August 9, 1887. Serial No. 246,551. (No model.)

*To all whom it may concern:*

Be it known that I, JOHN H. WHALING, of Kingman, in the county of Kingman and State of Kansas, have invented a certain new and useful Improvement in Couplings for Boring or Drilling Tools; and I do hereby declare the following to be a full, clear, and exact description thereof, reference being had to the accompanying drawings.

This invention pertains to a certain improvement in couplings for drilling or boring tools, having for its object to prevent the accidental separation or disconnection of the tool or drill from its shaft or rod, while at the same time providing a substantial connection between them; and to these ends the invention consists in combining with a bevel ended or headed coupling-screw a bevel-ended screw intercepting each other at right-angled planes, and certain other details of construction, substantially as hereinafter more fully set forth, and pointed out in the claims.

Figure 1:
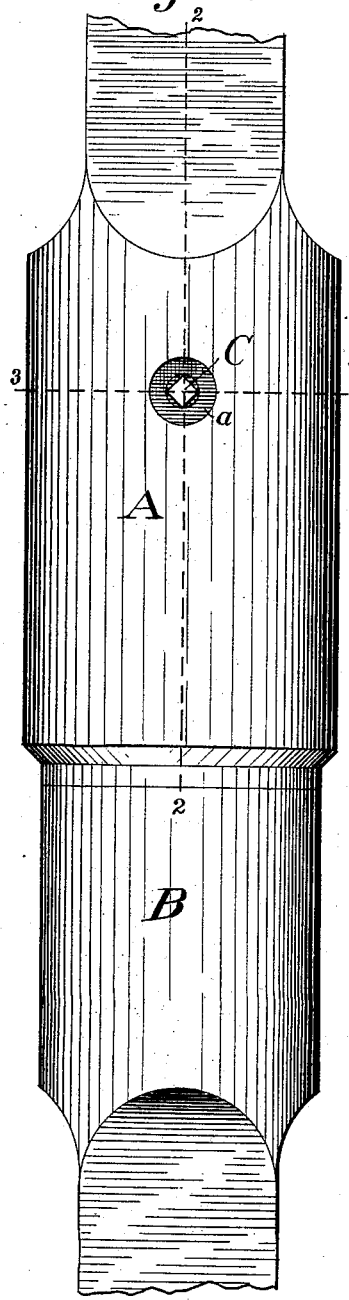
Figure 2:
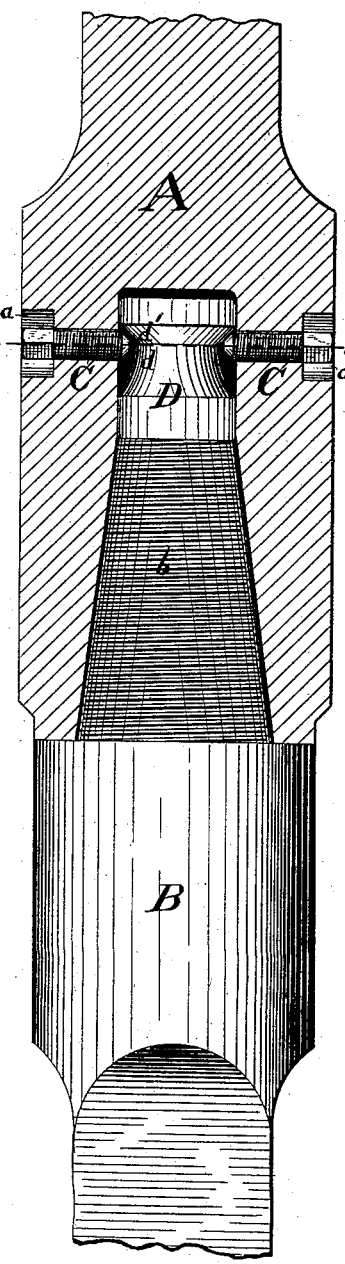
Figure 3:
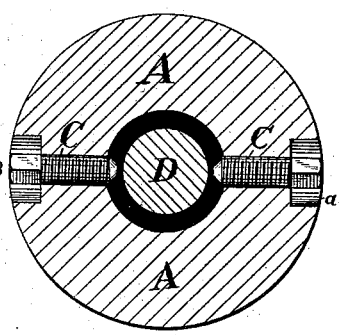

In the accompanying drawings, Figure 1 is a side elevation of a coupling embodying my invention. Fig. 2 is a partly side view and partly sectional view on the line 2 2 of Fig. 1, and Fig. 3 is a horizontal section on the line 3 3 of the same figure.

In the embodiment of my invention I provide the tool-shank B with a conical screw, $b$, which is formed at its outer and upper end with a plain or unthreaded extension or portion, D, which screw, with its extension, is received in a corresponding socket in the rod or shaft A. The plain or unthreaded portion or extension D of the screw $b$ is beveled, as at $d'$, which bevel extends from the lower or inner edge of its head inward a short distance, whence it is continued outward and downward, as at $d$, preferably a greater distance than its upper surface, thus forming a concavity in said plain or unthreaded portion.

C C are two left-hand-threaded screws, which are screwed horizontally into the shaft or rod A, with their inner ends beveled and intersecting or bearing against the beveled surface $d'$ of the plain or unthreaded portion D of the tool-connecting screw $b$. The outer headed ends of the screws C C are received into recesses or sockets in the outer surface of the shaft or rod A when screwed home, which is effected, as is also their retraction, by the application of a wrench to said ends or heads.

From the foregoing arrangement and construction of parts it will be seen that any tendency to turn of the screw $b$ will cause its beveled surface $d'$ to act upon the beveled ends of the screws C, which will have the effect to prevent any appreciable movement or unscrewing of the screw $b$. It will also be seen that the action of the contacting beveled surface of the plain portion D of the screw $b$ with the beveled ends of the screws C C will also have the effect, if any, to still further tighten the screws C C, thus effectually preventing any possibility of the accidental disconnection or separation of the tool from the rod or shaft. This coupling or connection is also substantial, being thus capable of resisting great pressure or vibrations to which it may be subjected.

Having thus described my invention, what I claim as new is—

1. The coupling for boring or drilling tools, comprising the bevel ended or headed screw and the additional bevel-ended screws intersecting the bevel end or head of the aforesaid screw, substantially as set forth.

2. The coupling for boring or drilling tools, comprising the tool-connecting screw having a plain or unthreaded portion or extension provided with a beveled surface extending from the inner edge of the head of the screw, the rod or shaft receiving said screw with its plain or unthreaded portion, and the screws also inserted into said rod or shaft and having beveled ends engaging with the beveled surface of the tool-connecting screw, substantially as specified.

JOHN H. WHALING.

Attest:
OMAR GILLETTE,
HUGH FORD.